(12) United States Patent
Tsu

(10) Patent No.: US 6,985,373 B2
(45) Date of Patent: Jan. 10, 2006

(54) BINARY BEAM STEERING DEVICE

(75) Inventor: David Tsu, Auburn Hills, MI (US)

(73) Assignee: Energy Conversion Devices, Inc., Rochester Hills, MI (US)

(*) Notice: Subject to any disclaimer, the term of this patent is extended or adjusted under 35 U.S.C. 154(b) by 0 days.

(21) Appl. No.: 10/899,999

(22) Filed: Jul. 27, 2004

(65) Prior Publication Data

US 2004/0264229 A1    Dec. 30, 2004

Related U.S. Application Data

(63) Continuation-in-part of application No. 10/226,828, filed on Aug. 23, 2002, now Pat. No. 6,768,666.

(51) Int. Cl.
*G11C 13/00* (2006.01)

(52) U.S. Cl. .................. 365/113; 365/163; 369/13.35; 369/284; 369/288; 257/2; 359/240; 359/243; 359/279; 359/290; 359/299; 359/321

(58) Field of Classification Search ........ 365/112–114, 365/163; 369/13.35, 284, 288; 257/2; 359/240, 359/243, 279, 290, 299, 321
See application file for complete search history.

(56) References Cited

U.S. PATENT DOCUMENTS

| | | | | |
|---|---|---|---|---|
| 4,653,024 A | * | 3/1987 | Young et al. ................ 365/113 |
| 4,710,899 A | * | 12/1987 | Young et al. ................ 365/113 |
| 4,820,394 A | * | 4/1989 | Young et al. .......... 204/192.26 |
| 5,687,112 A | * | 11/1997 | Ovshinsky .................. 365/163 |
| 5,825,046 A | * | 10/1998 | Czubatyj et al. ................ 257/2 |
| 5,846,638 A | * | 12/1998 | Meissner ..................... 428/220 |
| 5,935,672 A | * | 8/1999 | Zhou et al. ................ 428/64.1 |
| 6,011,757 A | * | 1/2000 | Ovshinsky ............... 369/13.35 |
| 6,106,983 A | * | 8/2000 | Burke ......................... 430/17 |
| 6,141,241 A | * | 10/2000 | Ovshinsky et al. ......... 365/163 |
| 6,562,526 B1 | * | 5/2003 | Burke ......................... 430/17 |
| 6,680,013 B1 | * | 1/2004 | Stein et al. .................... 264/44 |
| 6,882,460 B2 | * | 4/2005 | Tsu et al. .................... 359/279 |
| 2002/0160305 A1 | * | 10/2002 | Horie et al. ........... 430/270.13 |
| 2004/0264229 A1 | * | 12/2004 | Tsu ............................. 365/113 |
| 2005/0115829 A1 | * | 6/2005 | Yahagi et al. .......... 204/298.13 |

* cited by examiner

*Primary Examiner*—Evelyn A. Lester
(74) *Attorney, Agent, or Firm*—Kevin L. Bray; Marvin S. Siskind

(57) ABSTRACT

An element for steering electromagnetic beams. The element includes a phase change material in combination with dielectric and other layers in a multilayer optical stack. The phase change material that is reversibly transformable between two or more structural states, where different structural states differ with respect to refractive index and/or extinction coefficient. The structural state of the phase change material establishes a phase angle state for the element that dictates the direction of propagation of an output beam produced from an incident electromagnetic beam. Depending on the structural state, the element adopts one of two principal phase angle states and a binary beam steering capability is achieved in which an incident electromagnetic beam can be redirected in either of two directions. In a preferred embodiment, the output beam is a reflected beam and the element includes a phase change material sandwiched between two dielectric materials and supported by a metal layer.

26 Claims, 4 Drawing Sheets

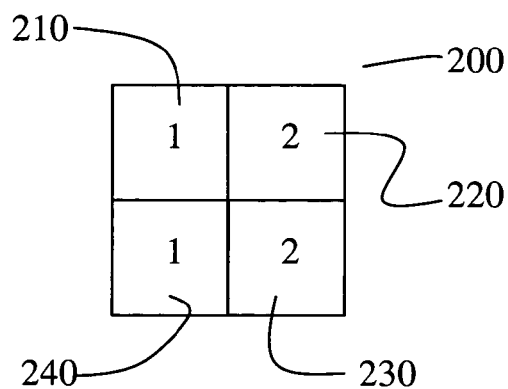
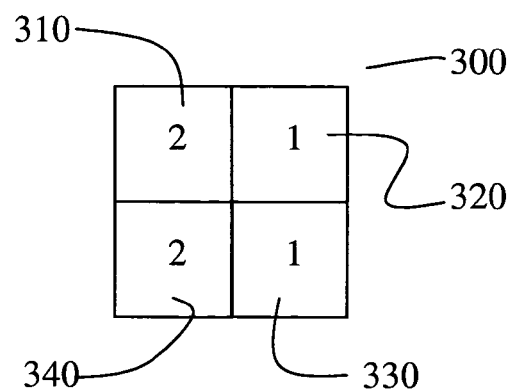
FIG - 6                    FIG - 7
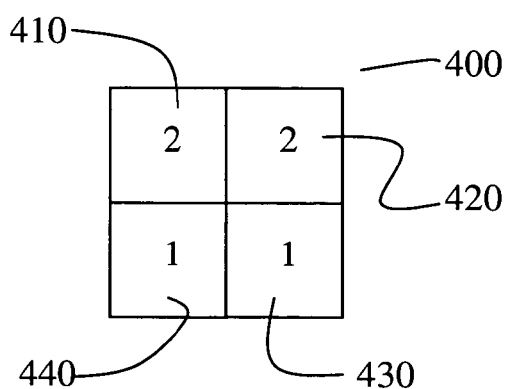
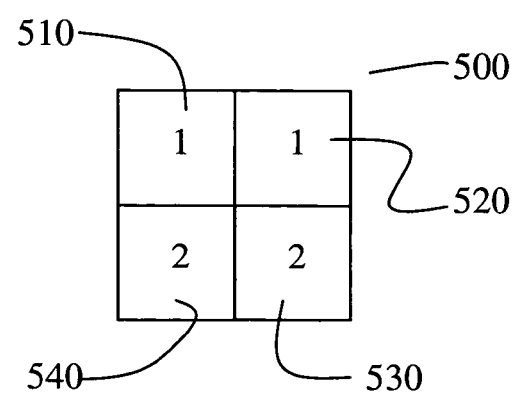
FIG - 8                    FIG - 9

BINARY BEAM STEERING DEVICE

RELATED APPLICATION INFORMATION

This application is a continuation in part of U.S. patent application Ser. No. 10/226,828 (published as US-2004-0036944-A1), now U.S. Pat. No. 6,768,666, filed on Aug. 23, 2002, and entitled "Phase Angle Controlled Stationary Elements for Wavefront Engineering of Electromagnetic Radiation", the disclosure of which is incorporated by reference herein.

FIELD OF INVENTION

This invention relates to a stationary element for controlling the phase angle characteristics of electromagnetic radiation. More specifically, this invention provides an optical element for controlling the direction of propagation of electromagnetic radiation. Most specifically, this invention provides a reconfigurable optical element that can be used to reversibly switch the direction of propagation of incident electromagnetic radiation from direction to another.

BACKGROUND OF THE INVENTION

The ability to route, redirect and control the flow of electromagnetic radiation is important in a number of technological applications. Optical information systems, for example, are expected to become increasingly important as the demand for high speed and high density transmission and storage of data escalates. In order to optimize the functionality of optical devices, it is necessary to exercise precise control over the direction of propagation of light. Reading and writing of optical data, for example, typically requires precise positioning of one or more optical beams at well-defined locations within an optical recording medium. In many applications, it is also desirable to exact control over the propagation of light with increasingly compact devices. Miniaturization and enhanced functionality of optical components are essential for future technologies. Similar capabilities are desired for electromagnetic frequencies outside the optical range.

Traditional devices for controlling the propagation of electromagnetic radiation include reflecting elements such as mirrors arid beam splitters, focusing elements such as lenses and parabolic mirrors, and dispersive elements such as prisms. These devices, of course, have proven to be remarkably reliable and effective at directing light in intended ways, but suffer from the drawback that once fabricated and-positioned, their ability to control the propagation of electromagnetic radiation is fixed. Any change in propagation requires a physical movement of the device and may involve cumbersome and/or slow alignment procedures.

Efforts at miniaturizing devices for controlling the propagation of electromagnetic radiation have recently focused on MEMS (micro-electro-mechanical systems) technology. MEMS components are small, lightweight and capable of routing electromagnetic radiation in miniature device packages. MEMS technology includes miniature mirrors configured in arrays that may contain several hundred mirrors that are precisely positioned and/or tilted relative to each other. MEMS is a potentially advantageous technology because the component masses are very and thus require little force for the repositioning necessary to achieve a dynamic performance capability. Most efforts at developing MEMS technology have focused on optical switching and optical crossconnects. MEMS technology may be used, for example, to direct optical signals to specific fibers in a fiber bundle and to redirect a signal to other fibers upon repositioning.

Although MEMS technology offers several potential advantages, its' implementation presents several problems. First, although MEMS components are repositionable, the repositioning is through a mechanical process and occurs on a millisecond timescale. Faster dynamic capability is desirable for many applications. Second, MEMS systems are delicate and susceptible to disruptions caused by external disturbances such as vibrations. These disturbances alter the positioning of MEMS components and impair functionality. Complicated feedback systems may thus be needed to insure robustness of operation in typical application environments. Third, MEMS systems are currently very expensive. The high cost is associated with the intricacies of fabricating the miniature components, the large number of components typically required for an application, and the precise assembling of components, along with actuating means, into the three-dimensional arrays required for many applications.

Accordingly, improved devices for controlling the propagation of electromagnetic radiation are needed in the art. Ideally, these devices should be stationary, dynamically reconfigurable, and provide for the reflection and redirection of electromagnetic radiation in an efficient, reproducible manner in user-determined directions spanning a large range of angles.

SUMMARY OF THE INVENTION

This invention provides a phase angle controlled stationary element that provides binary beam steering capabilities. The binary beam steering element has two distinct phase angle states. The operation of the instant elements is based on precise control of the phase angle of incident electromagnetic radiation to produce reflected output radiation in a direction prescribed by the phase angle state of the element. Each phase angle state directs an incident beam of electromagnetic radiation in a characteristic direction. Depending on the phase angle state of the element, incident electromagnetic radiation is thus redirected into one of two directions and a binary beam steering capability is thereby achieved.

The instant elements include an active region comprising a material reversibly transformable among two or more structural states, where structural transformation may be induced through the application of optical or electrical energy. The two or more structural states distinguish two phase angle states, each of which influences the phase angle of an incident electromagnetic beam in a distinct manner to produce a reflected output signal from the element that propagates in a direction dictated by the phase angle state. Reversible transformations between the two phase angle states are possible on fast time scales to provide for a dynamic beam steering capability.

In a preferred embodiment, the active region comprises a phase change material having a crystalline state and an amorphous state where a region of phase change material may include crystalline portions and amorphous portions in varying amounts to provide an active phase change region having a fractional crystallinity continuously variable between the crystalline and amorphous limits. Mutually exclusive ranges of fractional crystallinity between the crystalline and amorphous limits define two phase angle states, where the transformation from one phase angle state to the other occurs over a small range of fractional crystallinity.

Preferred phase change materials are chalcogenide materials. The chalcogenide materials include one or more chalcogen elements (S, Se, Te) in combination with one or more modifiers selected from the main group and/or transition elements. Preferred main group elements are elements from groups 5A (e.g. P, As, Sb), 4A (e.g. Si, Ge, Sn, Pb), and 3A (e.g. Al, Ga, In). Preferred transition metals include Zn and Cd.

In a preferred embodiment, the instant element includes an optical stack comprising a phase change layer sandwiched between two dielectric layers where the three layer combination (dielectric material—phase change material—dielectric material) is supported by a metal layer. By appropriately fixing the layer thicknesses, this embodiment of the instant invention provides for a binary steering capability.

BRIEF DESCRIPTION OF THE DRAWINGS

FIG. 6. A portion of a phase change layer that includes four phase change regions and a pattern of two phase angle states distributed therein.

FIG. 7. A portion of a phase change layer that includes four phase change regions and a pattern of two phase angle states distributed therein.

FIG. 8. A portion of a phase change layer that includes four phase change regions and a pattern of two phase angle states distributed therein.

FIG. 9. A portion of a phase change layer that includes four phase change regions and a pattern of two phase angle states distributed therein.

DETAILED DESCRIPTION OF THE ILLUSTRATED EMBODIMENTS

Figure 1:
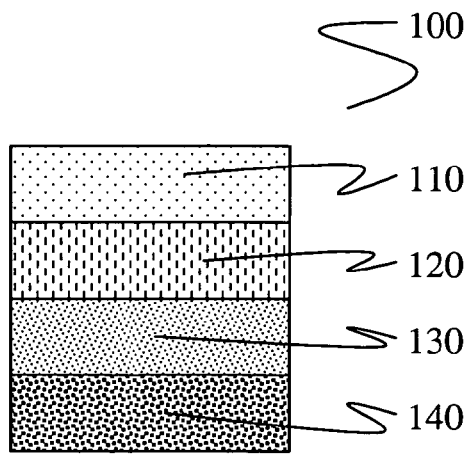
FIG. 1. A multilayer optical stack.

The instant invention provides a binary beam steering element having the capability of steering an incident beam or wavefront of electromagnetic radiation in either of two directions. An incident beam impinges on the surface of the element, interacts with the surface and interior of the element and is reflected to produce an output beam that propagates in one of two directions. The propagation direction of the reflected beam is determined by the phase angle state of the instant element.

The instant elements are multilayer optical stacks that include at least one active layer comprised of a phase change material along with ancillary layers such as dielectrics and metals. The phase change material is a material having two or more structural states and an ability to reversibly transform between those states through interactions with an energy field. The active layer can be transformed among two or more distinct states through variations in the relative proportions of the two or more structural states of the phase change material. The two or more distinct active layer states can be resolved into two groups, extending over mutually exclusive ranges in the relative proportions of the two or more structural states of the phase change material, that have distinct phase angle characteristics. These groups of states define the two distinct phase angle states of the instant elements.

The concept of phase angle control through variations in the structural state of phase change regions has previously been described in U.S. Patent Publication No. US-2004-0036944 A1 ('944 publication) assigned to the instant assignee, the disclosure of which is hereby incorporated by reference. The '944 publication describes phase angle control stationary elements (PACSE elements) that can be used to control the direction of reflection or transmittance, as well as the state of focusing, symmetry of the beam cross-section and wavefront characteristics, of an incident electromagnetic beam. The PACSE element of the '944 publication is a multilayer structure that is subdivided into sub-wavelength scale data cells. One or more of these layers is an active phase change material. The active phase change material had a crystalline state and an amorphous state and each data cell had a structural state characterized by the relative proportions of the crystalline and amorphous portions within the volume defined by the data cell. The structural states varied continuously in fractional crystallinity between the amorphous limit (0% fractional crystallinity) and the crystalline limit (100% fractional crystallinity). In the PACSE elements, the resulting phase angle characteristics of the data cells varied smoothly and continuously with the fractional crystallinity. By controlling the relative fractional crystallinity of different data cells in one or more directions and/or in various patterns along the surface of the PACSE elements, PACSE elements in accordance with the '944 can be used to control the direction of propagation and/or cross-sectional symmetry and/or state of focusing of reflected or transmitted electromagnetic beams.

The controlled variations of fractional crystallinity in one or more directions in the elements of the '944 publication were used to control the characteristics (e.g. direction of propagation, cross-sectional beam shape, state of focusing) of an output beam (e.g. reflected or transmitted beam or signal) by locally controlling its optical phase. Since the amorphous and crystalline states of a phase change material have different optical constants (e.g. refractive index (n), extinction coefficient (k)), these states impose a different phase delay on an incident electromagnetic beam. In a data cell having a fractional crystallinity intermediate between the amorphous and crystalline limits, the phase delay according to the effective medium approximation is an average determined by the relative proportions of the amorphous and crystalline regions within the data cell. By varying the fractional crystallinity of a series of data cells along a direction, a phase taper is created in which the difference in phase delay from data cell to data cell is non-zero. A gradient in fractional crystallinity in effect internally stores a differential phase angle response in the active material of the PACSE elements and is the underlying feature in the operation of the PACSE elements. The phase taper, in effect, controls the phase of the output beam by varying the optical path length encountered by the incident beam when it interacts with the element. Further discussion is provided in the '944 publication.

In terms of operating characteristics, the phase angle effects provided by the PACSE elements could be varied continuously through continuous changes in the fractional crystallinity of the data cells and the crystallinity gradient along a series of data cells. In the context of the instant invention, it can be said that a particular pattern or distribution of fractional crystallinity among the data cells defines a phase angle state of a PACSE element where the properties of a reflected or transmitted output beam are dictated by that phase angle state. By changing the pattern of fractional crystallinity, different phase angle states can be programmed into a PACSE element to provide for a wide range of conditions for the output beam. As discussed in the '944 publication, continuous changes in the direction of propagation, cross-sectional beam shape, and state of focusing of an output beam are achievable by varying the phase angle state of the PACSE element.

In this invention, a binary version of the PACSE elements is provided in which variations in, fractional crystallinity provide two principle phase angle states, rather than the continuum of phase angle states available in the PACSE elements. The instant elements may thus be referred to as PACSE-Lite elements. Each phase angle state is rather insensitive to even large changes in crystal fraction and the transition from one phase angle state to the other occurs over a narrow fractional crystallinity range.

The instant binary elements are multilayer optical stacks that further extend the degrees of freedom for controlling the phase characteristics of output beams emanating from a stationary optical element. The additional control afforded by the instant invention results from variations in the thicknesses of the layers in the optical stack. In the following discussion, illustrative multilayer stack configurations comprised of the same materials, but with different layer thicknesses, are compared and used to demonstrate the binary beam steering capability of the instant elements relative to the continuous beam steering capability of the PACSE elements of the '944 publication.

EXAMPLE

The features of an illustrative embodiment of this instant invention are described in this example. The embodiment is a four layer optical stack having the configuration schematically depicted in FIG. 1. The stack 100 includes a first dielectric layer 110, a phase change layer 120, a second dielectric layer 130 and a metal layer 140. An incident electromagnetic beam impinges the stack 100 from above to produce an output electromagnetic beam. The compositions and thicknesses of the different layers are included in Table 1 along with those of comparative elements comprised of the same compositions and also having the stack configuration shown in FIG. 1.

In this example, the first dielectric layer 110 (labeled D1 in table 1) and second dielectric layer 130 (labeled D2 in Table 1) are comprised of ZnS and $SiO_2$ in the molar ratio $(ZnS)_{0.8}(SiO_2)_{0.2}$. The phase change layer (labeled PCM in Table 1) is comprised of $Ge_2Sb_2Te_5$ and the metal layer is comprised of Al containing 1.5% Ti. Three different multilayer designs are included in Table 1 using these same materials: a Proportional design, a Transitional design, and a Binary design. The Binary and Transitional designs are embodiment of elements according to the instant invention. The Proportional design is analogous to a PACSE element in accordance with the '944 publication. As described more fully hereinbelow, a characteristic feature of the Proportional element is a smooth and continuous variation in the phase angle of a region of phase change material with variations in the crystalline volume fraction within the phase change region. A characteristic feature of the Binary element is an abrupt, nearly discontinuous change in the phase angle of a phase change region over a small range of crystalline volume fraction. The Transitional design has phase angle characteristics intermediate between those of the Proportional and Binary designs.

The three designs include layers of the same composition in the same order in the stack, but differ with respect to the thicknesses of the layers. The metal layer 140 has the same thickness (100 nm) for the three designs and is used to provide mechanical support to the other layers and further acts to provide back reflection. The active phase change layer 120 also has the same thickness (20 nm) for the three designs. The dielectric layer D2 has a similar thickness for the three designs (55 nm vs. 55 nm vs. 47 nm). The main difference in the three designs is the thickness of top dielectric layer D1 (60 nm vs. 10 nm vs. 10.1 nm). The bottom rows of Table 1 show the total difference $\Delta\phi$(in degrees) in optical phase angle (OPA) for each multilayer design and the change $\Delta f$ in fractional crystallinity of the phase change layer 120 needed to realize 90% of the total difference $\Delta\phi$ in OPA.

TABLE 1

| | | Thickness (nm) | | |
|---|---|---|---|---|
| Layer | Material | Proportional | Transitional | Binary |
| D1 | $(ZnS)_{0.8}(SiO_2)_{0.2}$ | 60 | 10 | 10.1 |
| PCM | $Ge_2Sb_2Te_5$ | 20 | 20 | 20 |
| D2 | $(ZnS)_{0.8}(SiO_2)_{0.2}$ | 55 | 55 | 47 |
| Metal | Al (1.5% Ti) | 100 | 100 | 100 |
| Full OPA Difference $\Delta\Phi$ | | 160° | 230° | 173° |
| $\Delta f$ needed to achieve 90% of $\Delta\Phi$ | | 0.90 | 0.78 | 0.04 |

Figure 2:
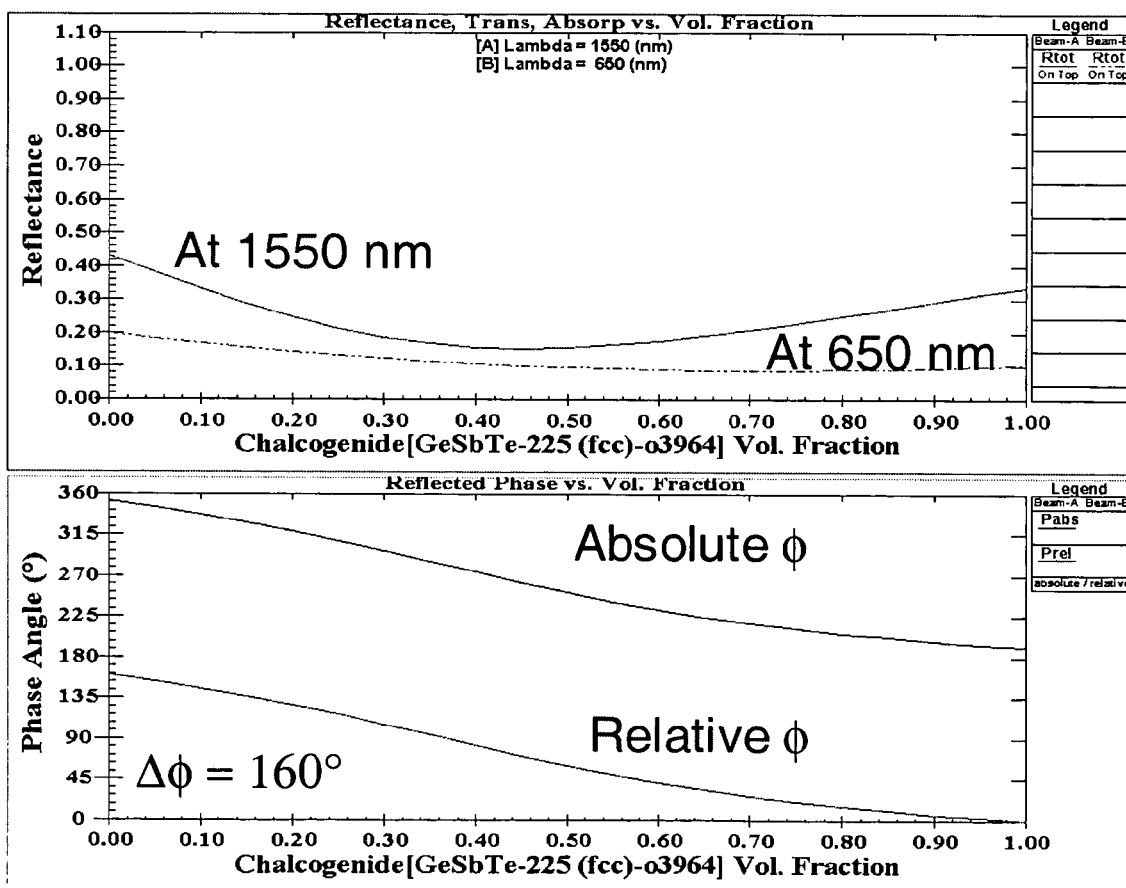
FIG. 2. Calculated reflectance and phase angle characteristics of an element having the Proportional design. The calculation includes 20 mesh points over the range of crystalline volume fraction extending from 0.0 to 1.0.
Figure 3:
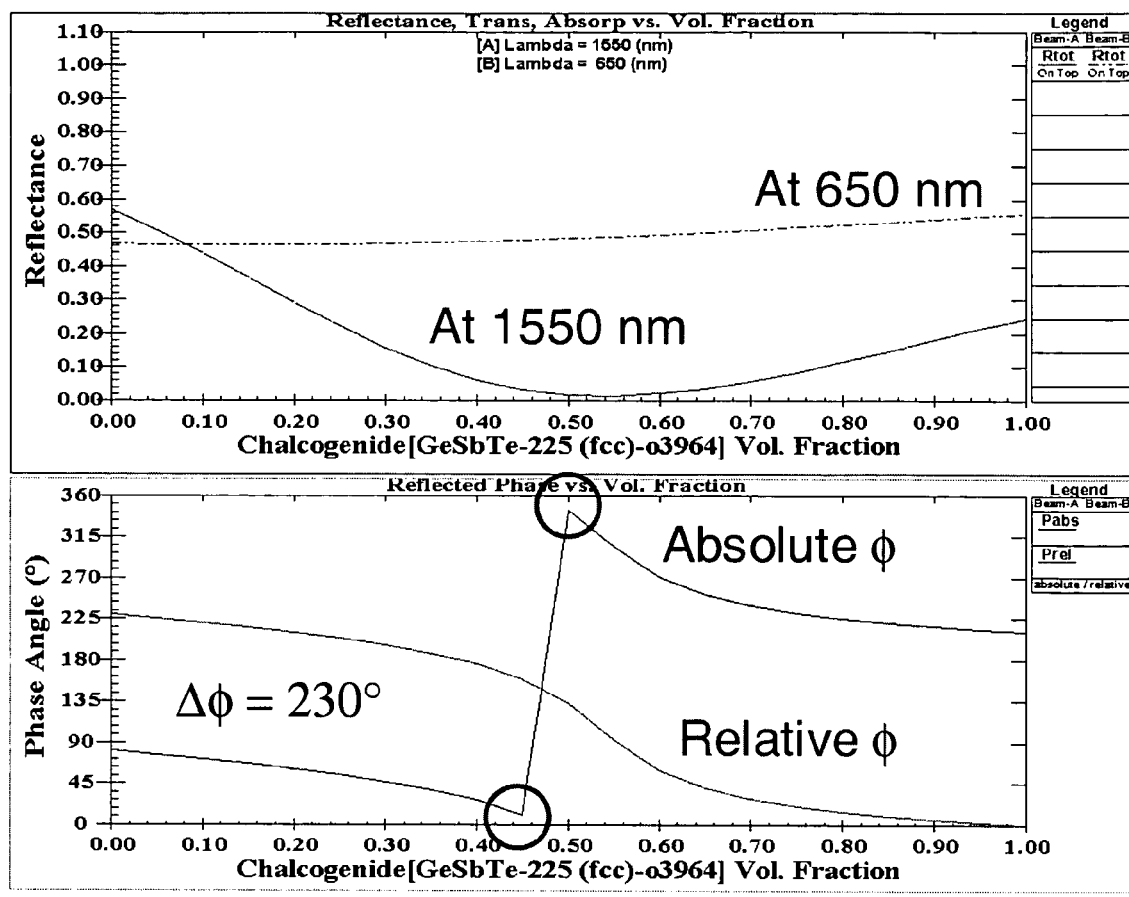
FIG. 3. Calculated reflectance and phase angle characteristics of an element having the Transitional design. The calculation includes 20 mesh points over the range of crystalline volume fraction extending from 0.0 to 1.0.
Figure 4:
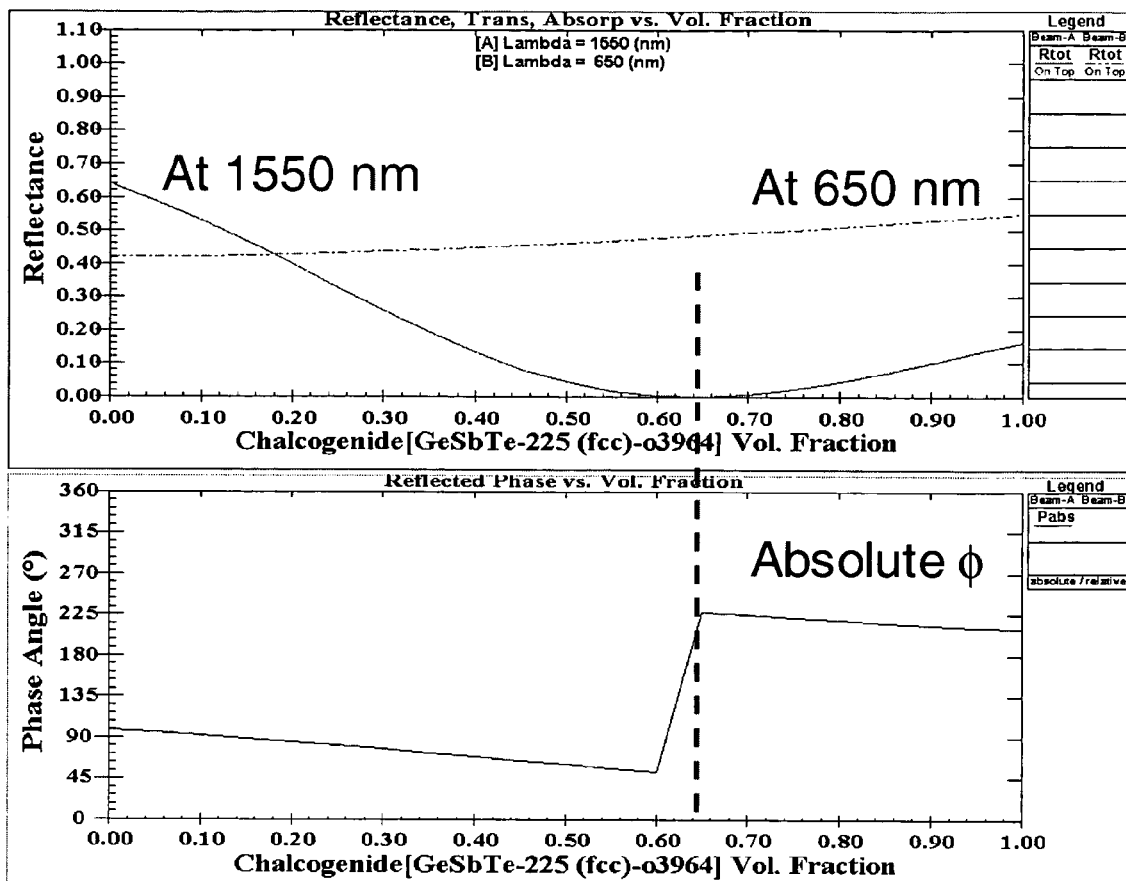
FIG. 4. Calculated reflectance and phase angle characteristics of an element having the Binary design. The calculation includes 20 mesh points over the range of crystalline volume fraction extending from 0.0 to 1.0.

The entries in the bottom rows of Table 1 are most conveniently understood with reference to the data shown in FIGS. 2–4. FIGS. 2, 3, and 4 show reflectance (upper panel) and phase angle (lower panel) data calculated for phase change regions within the phase change layer in elements having the Proportional, Transitional and Binary designs, respectively, summarized in Table 1. The properties depicted in FIGS. 2–4 correspond to regions within the active phase change layer 120 of the Proportional, Transitional, and Binary designs, respectively. As described more fully hereinbelow, beam steering effects result from arrangements within the phase change layer of different regions of phase change material, where the different regions vary with respect to fractional crystallinity. Formation of an appropriate pattern or arrangement of phase change regions within the phase change layer provides for beam steering. The data shown in FIGS. 2–4 pertain to properties of individual regions within an arrangement of regions that is used to provide beam steering in accordance with the instant invention.

The reflectance plots show the calculated reflectance of a region of phase change material as a function of the crystalline volume fraction within the active phase change layer 120 of the stack. Data are presented over the full range extending from the amorphous phase (crystalline volume fraction equal to zero) to the crystalline phase (crystalline volume fraction equal to one). Different points along the crystalline volume fraction axis correspond to states of the phase change region having different proportions of the crystalline and amorphous phases of the phase change material. These different points may be referred to herein as distinct structural states of the phase change material. Reflectance data is shown for incident electromagnetic radiation having wavelengths of 1550 nm and 650 nm. The phase angle plots show the calculated phase angle of a region of phase change material as a function of crystalline volume fraction of the phase change material for the 1550 nm calculation. Data are presented over the full range extending from the amorphous phase (crystalline volume fraction equal to zero) to the crystalline phase (crystalline volume fraction equal to one). The phase angle plots include an absolute phase angle result and a relative phase angle result. The absolute phase angle is the actual phase angle calculated for the phase change region, while the relative phase angle is obtained through an offset of the absolute phase angle data in which the minimum absolute phase angle is set equal to zero for the purpose of rescaling to more clearly observe the differential in phase angle across the range of crystalline volume fractions.

FIG. 2 shows the reflectance and phase angle data for a region of phase change material in the active phase change layer of an element having the Proportional design. The reflectance and phase angle data show a smooth dependence on the crystalline volume fraction of the phase change region. In terms of beam steering capabilities, the phase angle data is of greatest relevance. The total phase angle differential for the Proportional element is 160° and corresponds to the difference between the crystalline and amorphous endpoints of the crystalline volume fraction range. The pertinent aspect of the phase angle data is the continuous variation of phase angle over the range of crystalline volume fraction. Each crystalline volume fraction is associated with a distinct phase angle and therefore defines a distinct phase angle state for the phase change region. The Proportional design has the functionality of the PACSE element described in the '944 Publication. Each structural state of the phase change material corresponds to a distinct crystalline volume fraction, which in turn corresponds to a distinct phase angle and therefore a distinct phase angle state of the phase change region. The characteristics of the output beam produced by the element from an incident beam are uniquely determined by the pattern of fractional crystallinities associated with the phase change regions within the active phase change layer. The Proportional element provides for a continuous variation of characteristics within the overall limits imposed by the total phase angle differential and can be used to provide a continuous beam steering capability. The Proportional element features an essentially proportional relationship between phase angle and crystalline volume fraction for phase change regions within the phase change layer. As seen in Table 1, and change in $\Delta f$ of 90% is needed to accomplish a change of 90% in the optical phase angle.

FIG. 3 shows the reflectance and phase angle data for phase change regions within the phase change layer of an element having the Transitional design. The reflectance data at 650 nm show a gradual increase in reflectance as the crystalline volume fraction increases. The reflectance data at 1550 nm show a decrease between the amorphous endpoint and a crystalline volume fraction of about 0.55 and an increase between a crystalline volume fraction of about 0.55 and the crystalline endpoint. At its minimum, the reflectance of phase change regions of the Transitional element closely approaches, but does not quite reach, zero. The phase angle data for the phase change regions of the Transitional element show a smooth variation between the amorphous and crystalline endpoints. This is most easily seen in the relative phase angle data. The absolute phase angle data show a decrease from about 80° at the amorphous endpoint to a value approaching 0° as the crystalline volume fraction increases to about 0.45. Above about 0.45, the absolute phase angle data are arbitrarily shifted by 360° for scaling purposes to display the variation in absolute phase angle for crystalline volume fractions above about 0.45. Since phase angle is a periodic function, this scaling is purely for the benefit of presentation and is of no consequence as far as the properties of the element are concerned. The main difference between the Transitional element and the Proportional element is that the former shows a steeper variation in the relative phase angle at intermediate values of the crystalline volume fraction (i.e. a kink develops in the phase angle plot).

Figure 5:
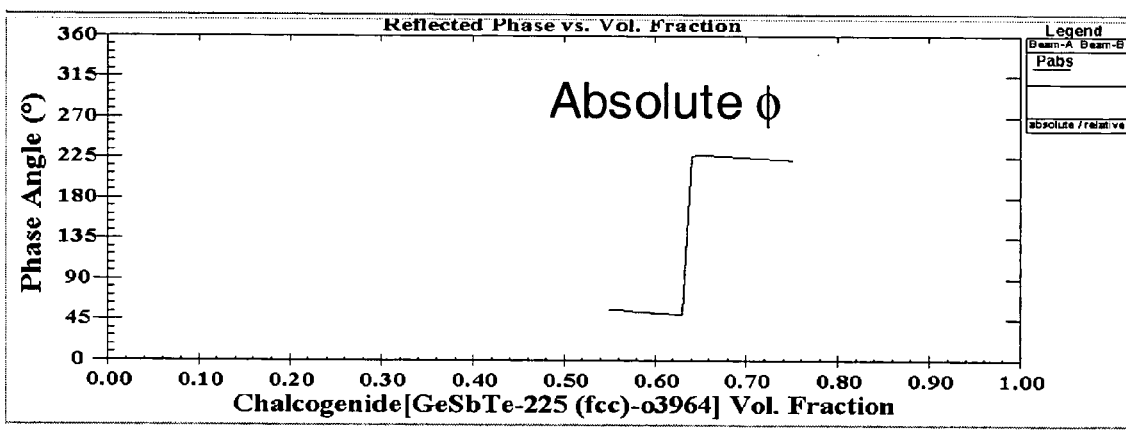
FIG. 5. High resolution calculation of the reflectance and phase angle characteristics of an element having the Binary design. The calculation includes 20 mesh points over the range of crystalline volume fraction extending from 0.55 to 0.75.

The trends noted for the Transitional design become even more pronounced in the Binary element. The reflectance and phase angle data calculated for phase change regions within the phase change layer of the Binary design are shown in FIG. 4. The reflectance data at 650 nm show a gradual increase with increasing crystalline volume fraction in the Binary design. At 1550 nm, the reflectance data are similar to the data observed for the Transitional design in that they exhibit a minimum. Relative to the Transitional design, however, the minimum is shifted to a higher crystalline volume fraction (about 0.64) and the value of the reflectance at the minimum is zero. The absolute phase angle data show in the vicinity of the minimum of the reflectance that an abrupt, nearly discontinuous change in absolute phase angle occurs. The behavior is further illustrated in FIG. 5, which shows a higher resolution calculation of the optical phase angle in the vicinity of the steep change in optical phase angle.

The nearly discontinuous behavior of the optical phase angle indicates that an abrupt change in the phase angle occurs over a narrow range of crystalline volume fraction of the phase change material. This narrow range may be referred to herein as a transformational range of crystalline volume fractions. The transformational range delineates the full range of crystalline volume fraction into three distinct regions: 1. Crystalline volume fractions extending from the amorphous endpoint up to a value just below the onset of the discontinuity (this range of crystalline volume fractions may be referred to herein as the pre-transformational range); 2. The narrow transformational range of crystalline volume fractions over which the phase angle changes abruptly; and 3. Crystalline volume fractions extending from just beyond the discontinuity up to the crystalline endpoint (this range of crystalline volume fractions may be referred to herein as the post-transformational range).

In the pre-transformational range and in the post-transformational range, the phase angle of phase change regions within the Binary element shows only a slight variation with crystalline volume fraction, with a large difference in phase angle existing between states in the pre-transformation range and states in the post-transformational range. The clear differentiation in phase angle between the pre-transformational states and the post-transformational states underlies the principle of operation of the Binary element of this invention. The similarity of the phase angle of the states in the pre-transformational range indicates that regions of phase change material in the different states in this range influence an incident electromagnetic beam in a similar way. The similarity of the phase angle of the states in the post-transformational range indicates that regions of phase change material in the different states in this range also influence an incident electromagnetic beam in a similar way.

The large disparity in phase angle of the pre- and post-transformational states indicates that phase change regions in states in those two ranges influence a particular incident electromagnetic beam in much different ways. As a result, the functionality of the element is binary in nature where the pre-transformational and post-transformational states may be viewed, at least approximately, as two distinct phase angle states and an arrangement of a plurality of phase change regions can be viewed as consisting of a pattern of the two distinct phase angle states. By way of analogy, the pre-transformational and post-transformational states of phase change regions within the phase change layer of an element having the Binary design are reminiscent of the "low" and "high" states in a conventional binary electronic device.

When a phase change region of a Binary element according to the instant invention is in a pre-transformational phase angle state, it has a characteristic influence on incident electromagnetic radiation that is markedly distinct from the characteristic influence produced by a post-transformational phase angle state on that radiation. Just as a "high" voltage in a binary electronic device is readily distinguished from a "low" voltage and produces a readily distinguishable effect on an electronic signal, the post-transformational phase angle states of the phase change regions of the instant Binary element are readily distinguished from the pre-transformational phase angle states and produce a readily distinguishable effect on an electromagnetic signal.

The structural states, or subsets thereof, within the pre-transformational range of phase change regions of a Binary element according to the instant invention may be collectively referred to as a distinct phase angle state of the phase change region. In an idealized embodiment, all structural states within the pre-transformational phase angle state have the same phase angle and no variation in the phase angle over the range of crystalline volume fraction associated with the pre-transformational phase angle state occurs. Secondly in an idealized embodiment, all structural states within the post-transformational range have the same phase angle and no variation in the phase angle over the range of crystalline volume fraction associated with the post-transformational phase angle state occurs. Thirdly in an idealized embodiment, the transformation range of crystalline volume fraction is arbitrarily narrow and occurs discontinuously.

Due to statistical variations in factors such as processing conditions, compositional or thickness uniformity in the phase change layer and surrounding layers of an element, imperfections, impurities etc., as well as design preferences, small deviations from the idealized conditions of a Binary element may occur or be desired. Embodiments of the instant invention further include Binary elements in which small variations in phase angle occur within each of the two principle phase angle states of the phase change regions. In these embodiments, each of two phase angle state includes a plurality of structural states, where each structural state is characterized by particular proportions of crystalline and amorphous regions. Each phase angle state extends over a range of proportions of crystalline and amorphous regions and provides a range of phase angles extending over a characteristic interval where the range of proportions of crystalline and amorphous phases and the phase angle intervals of the two phase angle states are non-overlapping.

With respect to the embodiment whose properties are represented in FIG. 4, for example, there is a first phase angle state spanning a range of crystalline volume fractions extending from the amorphous endpoint (0.0 or 0%) up to a crystalline volume fraction of about 0.60 (60%) and a second phase angle state spanning a range of crystalline volume fractions extending from a crystalline volume fraction of about 0.65 (65%) up to the crystalline endpoint (1.0 or 100%). The first phase angle state provides an interval of phase angles extending from about 54° to 99° and the second phase angle state provides an interval of phase angles extending from about 207° to 225°. In this embodiment, the ranges of crystalline volume fraction of the two phase angle states are non-overlapping and the intervals of phase angles are non-overlapping. The two phase angle states are separated by a narrow transformational range of crystalline volume fraction between crystalline volume fractions of about 0.60 and 0.65 over which an abrupt change in phase angle occurs, where about 90% of the abruptness occurs over a change in crystalline volume fraction of 0.04.

The abrupt change in phase angle over a narrow range of crystalline volume fraction is one feature that distinguishes the instant elements from the PACSE elements of the '944 publication. The abruptness can be described in terms of the change in phase angle that occurs and the range of crystalline volume fractions over which the change in phase angle occurs. As is seen in FIGS. 2–4, the design of the element provides for control over the abruptness of the change in phase angle. In the Proportional design having the characteristics of FIG. 2, there is only a gradual change in phase angle and a large range of crystalline volume fraction is needed to see a significant change in phase angle. In the Transitional design having the characteristics shown in FIG. 3, the phase angle variation becomes steeper and more abrupt in the range of crystalline volume fractions in the vicinity of 0.50–0.60. In this range, a larger change in phase angle is observed per unit change in crystalline volume fraction. In the Binary design having the characteristics shown in FIG. 4, the phase angle change is even more abrupt.

In the embodiment having the characteristics of FIG. 4, we can describe the abruptness of the phase angle change between the two phase angle states in a simple way by considering the phase angle and crystalline volume fraction difference that exists between the structural state of the first phase angle state having the maximum proportion of crystalline regions and the structural state of the second phase angle state having the minimum proportion of crystalline regions. The maximum crystalline proportion structural state of the first phase angle state is about 0.60 and the phase angle of this state is about 54°. The minimum crystalline proportion structural state of the second phase angle state is about 0.65 and the phase angle of this state is about 225°. In this embodiment, therefore, we observe a change in phase angle of 171° over a range of crystalline volume fraction of 0.05 (5%).

In a preferred embodiment herein, a change in phase angle of at least 45° occurs over a range of crystalline volume fraction of less than or equal to 20%. In a more preferred embodiment herein, a change in phase angle of at least 90° occurs over a crystalline volume fraction range of less than or equal to 15%. In a most preferred embodiment, a change in phase angle of at least 135° occurs over a crystalline volume fraction range of less than or equal to 5%.

As further indicated in FIGS. 2–4, the abruptness of the change in phase angle is related to the minimum reflectance of the element for the wavelength of incident electromagnetic radiation. Since FIGS. 2–4 present phase angle data for an incident electromagnetic beam having a wavelength of 1550 nm, we consider reflectance values at this wavelength in this discussion. In the Proportional design, the minimum reflectance at 1550 nm is about 0.16 (16%) (FIG. 2). In the Transitional design, the minimum reflectance at 1550 nm is about 0.02 (2%) (FIG. 3). In the Binary design, the minimum reflectance at 1550 nm is 0 (0%) (FIG. 4). It is accordingly observed in a preferred embodiment that the change in phase angle becomes increasingly abrupt as the minimum reflectance decreases. It is further noted that this minimum reflectance occurs at an intermediate crystalline volume fraction away from the amorphous and crystalline endpoints.

In a preferred embodiment herein, the minimum reflectance of the element is 5% or less at the incident wavelength. In a more preferred embodiment herein, the minimum reflectance of the element is 2% or less at the incident wavelength. In a most preferred embodiment, the minimum reflectance at the incident wavelength is 0%.

The interval of phase angles provided by the phase angle states of the instant element are a further parameter of interest. The interval of phase angles can be controlled through the design of the device (including layer compositions and thicknesses) and also by the range of proportions of the crystalline and amorphous states included within the subset of structural states associated with each phase angle state. In a preferred embodiment, the interval of phase angles provided by one or both phase angle states spans a range of 60° or less. In a more preferred embodiment, the interval of phase angles provided by one or both phase angle states spans a range of 45° or less. In a still more preferred embodiment, the interval of phase angles provided by one or both phase angle states spans a range of 20° or less.

The foregoing EXAMPLE has described the features and principle of operation of the instant invention using a phase change material having a crystalline state and an amorphous state where the relative proportions of the crystalline and amorphous states can be continuously varied to provide a series of structural states that can be further grouped into subsets of structural states that define a first phase angle state and a second phase angle state of phase change regions within the active phase change layer of the instant elements. The subsets of structural states of the two phase angle states extend over non-overlapping ranges of proportions of crystalline volume fraction of the phase change layer and provide non-overlapping intervals of phase angle.

A binary beam steering capability is achieved in the instant device through an arrangement of such regions of phase change material within the active layer in which adjacent regions are of an appropriate size and in a different one of the two phase angle states described hereinabove. General principles and some general size requirements are described in the '944 Publication for the PACSE elements (which are based on the proportional design described hereinabove) and are further relevant to the instant invention. A selective review of some of these principles and their specific application to the instant binary elements is of value in further understanding the invention.

As in the case of the PACSE elements, the instant binary elements are non-diffracting elements. In order to insure a non-diffracting condition, the separation between periodically positioned objects must be smaller than the wavelength of the electromagnetic radiation incident to the element. This consideration is further described in the '944 Publication where it is shown that a feature associated with the beam steering effect is that the separations between periodically positioned marks are below the wavelength of the incident electromagnetic radiation. Beam steering in the PACSE elements is based on a continuous variation in phase angle as described hereinabove for the Proportional design and involves the creation of a phase taper through formation of a gradient in the crystalline volume fraction over a series of phase change regions (data cells), each of which has a dimension that is below the wavelength of the incident electromagnetic radiation in order to prevent diffraction. By controlling the variation in crystalline volume fraction per unit length of the PACSE element, a continuous variation in phase angle across the element is produced and a continuous beam steering capability is achieved as a result.

In the instant elements, beam steering is binary in nature because the elements provide for essentially two, rather than a continuum of, phase angle states for the phase change regions that are arranged within the active phase change layer. Although gradients in crystalline volume analogous to those found in the PACSE element can be created in the instant elements, these gradients do not provide the corresponding continuous variation in phase angle across the element as occurs in the PACSE elements due to the binary nature of the element. Irrespective of the fractional crystallinity (and neglecting for the moment the transformational region between the two phase angle states), a region of phase change material is necessarily in one of two phase angle states. The beam steering capability is thus more limited in the instant elements than in the PACSE elements because the number of phase angle states available for different phase change regions within the phase change layer is much more limited in the instant binary elements.

In the instant elements, the beam steering capability results from a phase taper that extends over two phase angle states where the phase taper is formed through a juxtaposition of adjacent regions in the element, each of which includes a phase change material that is in a different one of the two available phase angle state. A periodic arrangement of the juxtaposed regions across the element provides for beam steering where the direction of beam steering depends on the relative position of the regions having the two phase angle states. As described more fully hereinbelow, beam steering in discrete (e.g. left-right or up-down steering), rather than continuous, directions is achieved in the instant elements.

Binary beam steering requires a manifestation of the effect of two juxtaposed regions of phase change material, each of which is in a different one of the two available phase angle states. In order for the binary phase taper embodied in the juxtaposed regions to influence an incident beam, the incident beam must perceive the taper. This requires that the binary phase taper be contained within a range of dimensions that can be sampled by a wavelength of the incident beam. The length scale sampled by an incident beam is determined by the wavelength of the beam in conjunction with any focusing provided to the beam when directing it onto the element. In a simple approximation sufficient for illustrative purposes, the length scale ($\Delta x$) sampled by an incident beam can be estimated through the following formula:

$$\Delta x \sim \frac{\lambda}{2NA}$$

where $\lambda$ is the wavelength of the incident beam and NA is the numerical aperture of the optics directing the beam to the surface of the element. In a typical application of interest, the incident electromagnetic beam is a telecommunications signal having a wavelength of about 1550 nm and is being directed by optics having a numerical aperture of about 0.25. The resulting length scale sampled by the incident beam is therefore about 3100 nm, which is equivalent to about $2\lambda$. In order for the incident beam to perceive the binary phase taper, each of the two juxtaposed phase change regions that form the phase taper must have linear dimensions no larger than about $\lambda$. An example of a binary phase taper according to the instant invention thus consists of a periodic arrangement of juxtaposed regions of phase change material, each of which is in a different one of the two available phase angle states described hereinabove, where each region has a linear length scale of about $\lambda$. As an example, a representative embodiment is one that includes square shaped phase change regions having the dimensions of $\lambda \times \lambda$. Smaller dimensions (e.g. $\lambda/2 \times \lambda/2$, $\lambda/3 \times \lambda/3$, $\lambda/4 \times \lambda/4$, etc.) are also possible and operative according to the principles of the instant invention. As indicated hereinabove, variations in the numerical aperture of the focusing optics provide further degrees of freedom in controlling the size of the juxtaposed regions that define the binary phase taper.

An electromagnetic beam incident to the element is reflected in a direction dictated by the phase angle state of the arrangement of phase change regions of the element as described hereinabove. Appropriate patterns of the two phase angle states reflect the incident beam in mutually exclusive directions. Each phase angle state influences the direction of reflection of the beam to an extent determined by its the interval of its associated phase angles. Since the phase angle intervals are non-overlapping, the direction of reflection of an incident beam approaching from a particular direction differs depending on the distribution of the two phase angle states over an arrangement of phase change regions within the element. By narrowing the interval of phase angles associated with one or both phase angle states, it is possible to precisely control the direction of reflection.

The phase change regions of the instant element can be reversibly transformed between the first and second phase angle states through the providing of energy. Preferred forms of energy include electrical, optical and thermal. By providing energy, it is possible to change the structural state of the element by altering the relative proportions of the crystalline and amorphous regions of the phase change regions within the phase change layer. Transformations in both directions between the amorphous and crystalline phases are readily achieved, reversible and highly reproducible over a large number of transformation cycles. Further details of the transformation characteristics of phase change materials are available in the '944 application.

By controlling the phase angle state of the phase change regions, an incident beam of electromagnetic radiation can be directed into one of two general directions. A switching effect can be achieved through the modulation of the phase angle state of the phase change regions within the element. A modulated application of energy suitable for the transformation of the phase change regions of the phase change layer from a structural state within the range associated with the first phase angle state to a structural state within the range associated with the second phase angle state (or vice versa) over the arrangement of phase change regions provides for a switching of the direction from one general direction to another.

FIGS. 6–9 show examples of portions of the phase change layer of the instant element. FIG. 6 includes a portion 200 of a phase change layer that includes phase change regions 210, 220, 230, and 240 according to the instant invention. FIG. 7 includes a portion 300 of a phase change layer that includes phase change regions 310, 320, 330, and 340 according to the instant invention. FIG. 8 includes a portion 400 of a phase change layer that includes phase change regions 410, 420, 430, and 440 according to the instant invention. FIG. 9 includes a portion 500 of a phase change layer that includes phase change regions 510, 520, 530, and 540 according to the instant invention. Each of the phase change regions in FIGS. 6–9 is in a first (labeled "1") or second (labeled "2") phase angle state and the arrangement of phase change regions represent a pattern or distribution of phase angle states within the phase change layer that provide for beam steering. FIGS. 6 and 7 represent embodiments in which left—right beam steering or switching is achieved, while FIGS. 8 and 9 represent embodiments in which up—down beam steering or switching is achieved.

The phase change materials of the foregoing illustrative embodiment of the instant invention have a crystalline state and an amorphous state and may be reversibly transformed between these states through the providing of energy. Many properties and compositions of phase change materials are known in the art and have been discussed previously, for example, in U.S. Pat. Nos. 3,271,591; 3,530,441; 4,653,024; 4,710,899; 4,737,934; 4,820,394; 5,128,099; 5,166,758; 5,296,716; 5,534,711; 5,536,947; 5,596,522; 5,825,046; 5,687,112; 5,912,104; 5,912,839; 5,935,672; 6,011,757; and 6,141,241 to the instant assignee, as well as U.S. Pat. Appl. Pub. Nos. 2002-0114256-A1 and 2003-0048744-A1 to the instant assignee, the disclosures of which are hereby incorporated by reference.

The application of energy to a phase change material induces transformations among its structural states. Phase change materials have characteristic melting and crystallization temperatures and the structural state may be influenced through the controlled application of energy vis-á-vis these temperatures. Application of energy sufficient to heat a phase change material above its melting temperature followed by rapid quenching promotes the formation of an amorphous phase. Slow quenching, on the other hand, may permit crystallization and the formation of crystalline regions within the phase change material to provide partially crystalline or crystalline materials. Application of energy in an amount sufficient to heat a phase change material to between its crystallization and melting temperatures may induce a partial or complete transformation of amorphous regions to a crystalline phase.

Whether or not crystalline regions form from amorphous regions and the extent to which they form depend on the amount of energy applied to the phase change material and/or the power (i.e. rate of addition of energy) applied. The amount of energy and/or power necessary to induce formation of crystalline regions or to modify existing crystalline regions in a phase change material through growth or depletion depends on factors such as the chemical composition of the phase change material, the initial state of the phase change material, and the kinetics and thermodynamics of crystal nucleation and growth processes. Amorphous regions may also be formed from crystalline regions. Formation of amorphous regions requires application of a sufficient amount of energy to induce a molten or other high mobility state and a sufficient rate of quenching to inhibit formation of a crystalline phase.

Energy may be applied to selected portions of a volume of phase change material to induce localized structural transformations without disturbing surrounding portions of the phase change material. Such localized structural transformations may also be used to alter the volume fraction of, for example, an amorphous phase within a surrounding crystalline phase. Phase stabilization and transformations among structural states are influenced by factors that include the kinetics and thermodynamics of crystallization processes, the distribution and flow (e.g. dissipation, diffusion, conduction) of energy within the phase change material as well as the intensity, duration and spatial distribution of applied energy. Localized structural transformations may also be used to control the size, shape or volume of one phase within a surrounding matrix of another phase. The shaping of amorphous phase regions (e.g. marks) within a crystalline matrix using a low thermal budget strategy, for example, has been previously described in U.S. Pat. Appl. Pub. No. 2002-0114256-A1 incorporated by reference hereinabove.

Transformations among structural states are effected upon the application of energy to a phase change material, or portions thereof, in appropriate amounts at appropriate rates. Energy in various forms may be used to effect transformations among structural states. The energy may be in the form of electromagnetic radiation (including infrared, optical, laser and microwave sources), electrical energy, thermal energy, chemical energy, magnetic energy, mechanical energy, particle beam energy, acoustic energy or combinations thereof using a single energy source or a plurality of energy sources. Delivery of electrical energy, for example, may be in the form of electrical current or voltage and may be continuous or in the form of a pulse whose height and width can be controlled. Optical energy may be in the form of a pulsed or continuous laser beam having a controlled wavelength, lineshape, energy and/or power. A diode laser is one example of an optical energy source suitable for use in the instant invention.

U.S. Pat. Nos. 4,653,024; 4,710,899; 4,737,934; 4,820,394; 5,128,099; 5,912,104; 5,935,672; 6,011,757 and U.S. Pat. Appl. Pub. Nos. 2002-0114256-A1 and 2003-0048744-A1 incorporated hereinabove by reference describe examples of structural states of phase change materials when used as optical recording media. These references generally describe an ability to reversibly transform a phase change material between a substantially crystalline state and a substantially amorphous state using, for example, optical excitation sources having suitable wavelengths, intensities, powers, and lineshapes. In a typical optical recording application, data cells comprising a phase change material are used to store, write or erase data. The erased state is typically a substantially crystalline state and writing occurs by providing energy in an amount sufficient to create an amorphous mark within the volume of phase change material corresponding to a data cell. Through the judicious control of the rate, amount and spatial distribution of applied energy and the thermal budget, it is possible to precisely control the shape and volume of amorphous marks formed within a data cell. Consequently, the relative proportions of the crystalline and amorphous states of a phase change material in a data cell may be readily and continuously varied to provide the structural states described hereinabove. Illustrative phase change materials suitable for use in accordance with the instant invention are those that include one or more of the elements In, Ag, Te, Se, Ge, Sb, Bi, Pb, Sn, As, S, Si, P, O and mixtures or alloys thereof, sometimes preferably in a eutectic composition. In a preferred embodiment, the phase change material includes a chalcogen element. In a most preferred embodiment, the phase change material includes Te as the chalcogen element. Also preferred are phase change materials that include a chalcogen in combination with Ge and/or Sb such as $Ge_2Sb_2Te_5$, $Ge_4SbTe_5$, $Sb_2Te_3$ and related materials. GeTe alone or in solid solution with CdTe constitutes another preferred embodiment. In another preferred embodiment, the phase change material includes Ag and/or In; especially in combination with Sb and/or Te. Eutectic compositions within the AgInSbTe family, such as AIST, are another most preferred embodiment. In another preferred embodiment, the phase change material includes a chalcogen and a transition metal such as Cr, Fe, Ni, Nb, Pd, Pt or mixtures and alloys thereof. Some examples of phase change materials suitable for use in accordance with the instant invention are provided in the U.S. Patents incorporated by reference hereinabove.

The preferred embodiments of the instant invention include a phase change layer sandwiched between two dielectric layers. The dielectric layers surrounding the phase change layer may be comprised of the same or different dielectric material and may be the same or different thickness relative to each other and the phase change layer. The dielectric layers of the instant invention are generally oxide materials or large bandgap semiconductor materials that are insulators or that exhibit low electrical conductivity when exposed to the incident electromagnetic beam. Preferred dielectric materials include $SiO_2$, ZnS, $Al_2O_3$, $GeO_2$, and $TiO_2$ as well as alloys and combinations of these. Other embodiments further include a metallic layer, as in the foregoing EXAMPLE, on which a dielectric layer—phase change layer—dielectric layer stack is supported. The metal layer provides additional mechanical support and further provides for back reflection of the incident electromagnetic beam. Preferred metallic layers are reflective materials and comprise one or more of Al, Au, Ag, Pt, Cu, Ti, stainless steel, including alloys and combinations of these.

The principles of operation presented hereinabove for the embodiment in which the active layer comprising a phase change material having a crystalline and amorphous states apply analogously to an arbitrary phase change material having two or more crystallographic forms, where the different crystallographic forms possess different optical constants. Crystalline and amorphous states are examples of crystallographic forms of a phase change material and further examples include those having two or more crystallographically distinct crystalline states. A phase change material, for example, have two crystalline states, each of which is a distinct phase having a distinct crystallographic signature. Crystallographic forms corresponding to crystalline states that differ with respect to unit cell shape or dimensions, for example, are possible. Transformations, for example, between two or more of crystalline phases having fcc, bcc, hcp, orthorhombic, monoclinic, rhombohedral, tetragonal, etc. unit cells provide the functionality required of the instant elements. Distinct crystallographic forms may also include differences in chemical bonding, layering and coordination number. Structural states can be defined in terms of different proportions of each of two crystallographic forms (e.g. the relative proportions of a first crystalline state and a second crystalline state) and phase angle states can be defined in terms of ranges extending over subsets of structural states extending over non-overlapping proportions of different crystallographic forms.

The disclosure and discussion set forth herein is illustrative and not intended to limit the practice of the instant invention. While there have been described what are believed to be the preferred embodiments of the instant invention, those skilled in the art will recognize that other and further changes and modifications may be made thereto without departing from the spirit of the invention, and it is intended to claim all such changes and modifications that fall within the full scope of the invention. It is the following claims, including all equivalents, in combination with the foregoing disclosure and knowledge commonly available to persons of skill in the art, which define the scope of the instant invention.

I claim:

1. An element for directing an incident electromagnetic beam comprising
   a first dielectric layer;
   an active layer formed on said first dielectric layer, said active layer comprising a plurality of phase change regions, said phase change regions comprising a phase change material, said phase change material having a first crystallographic form and a second crystallographic form, said phase change regions having a plurality of structural states, each of said structural states including a first proportion of said first crystallographic form and a second proportion of said second crystallographic form; and
   a second dielectric layer formed on said active layer;
   said phase change regions having a first phase angle state and a second phase angle state, said phase change regions providing a first interval of phase angles when in said first phase angle state and a second interval of phase angles when in said second phase angle state, said first phase angle state including a first subset of said structural states spanning a first range of proportions of said first crystallographic form, said second phase angle state including a second subset of said structural states spanning a second range of proportions of said first crystallographic form, said first and second ranges of said proportions of said first crystallographic form being non-overlapping;
   wherein the structural state of said first phase angle state having the maximum proportion of said first crystallographic form and the structural state of said second phase angle state having the minimum proportion of said first crystallographic form differ in the proportion of said first crystallographic form by less than or equal to 20% and the phase angle of said maximum proportion of said first crystallographic form state of said first phase angle state and the phase angle of said minimum proportion of said first crystallographic form state of said second phase angle state differ by at least 45°.

2. The element of claim 1, wherein said first crystallographic form is a crystalline state.

3. The element of claim 2, wherein said second crystallographic form is an amorphous state.

4. The element of claim 1, wherein said phase change material comprises S, Se, or Te.

5. The element of claim 4, wherein said phase change material further comprises Ge.

6. The element of claim 5, wherein said phase change material further comprises Sb.

7. The element of claim 1, wherein said phase change material comprises In, As, Ag, Bi, Pb, Sn, Si, P, or O.

8. The element of claim 1, wherein said first and second dielectric layers are comprised of $SiO_2$, ZnS, $Al_2O_3$, $GeO_2$, or $TiO_2$.

9. The element of claim 1, further including a metallic layer, said first dielectric layer being formed on said metallic layer.

10. The element of claim 9, wherein said metallic layer comprises Al, Au, Ag, Pt, Cu, or Ti.

11. The element of claim 1, wherein said phase change regions have a minimum reflectance of less than 5%.

12. The element of claim 1, wherein said phase change regions have a minimum reflectance of less than 2%.

13. The element of claim 1, wherein said phase change regions have a minimum reflectance of 0%.

14. The element of claim 1, wherein the structural state of said first phase angle state having the maximum proportion of said first crystallographic form and the structural state of said second phase angle state having the minimum proportion of said first crystallographic form differ in the proportion of said first crystallographic form by less than or equal to 15% and the phase angle of said maximum proportion of said first crystallographic form state of said first phase angle state and the phase angle of said minimum proportion of said first crystallographic form state of said second phase angle state differ by at least 90°.

15. The element of claim 1, wherein the structural state of said first phase angle state having the maximum proportion of said first crystallographic form and the structural state of said second phase angle state having the minimum proportion of said first crystallographic form differ in the proportion of said first crystallographic form by less than or equal to 5% and the phase angle of said maximum proportion of said first crystallographic form state of said first phase angle state and the phase angle of said minimum proportion of said first crystallographic form state of said second phase angle state differ by at least 135°.

16. The element of claim 1, wherein said first subset of structural states includes the fully crystalline structural state.

17. The element of claim 1, wherein said second subset of structural states includes the fully amorphous structural state.

18. The element of claim 1, wherein said first interval of phase angles spans no more than 60° and said first range of proportions spans a range of proportions of at least 20% in said first crystallographic form.

19. The element of claim 18, wherein said second interval of phase angles spans no more than 60° and said second range of proportions spans a range of proportions of at least 20% in said second crystallographic form.

20. The element of claim 18, wherein said first range of proportions spans a range of proportions of at least 40% in said first crystallographic form.

21. The element of claim 18, wherein said first interval of phase angles spans no more than 45°.

22. The element of claim 21, wherein said first range of proportions spans a range of proportions of at least 40% in said first crystallographic form.

23. The element of claim 21, wherein said second interval of phase angles spans no more than 45° and said second range of proportions spans a range of proportions of at least 20% in said second crystallographic form.

24. The element of claim 18, wherein said first interval of phase angles spans no more than 20°.

25. The element of claim 24, wherein said second interval of phase angles spans no more than 20° and said second range of proportions spans a range of proportions of at least 20% in said second crystallographic form.

26. The element of claim 24, wherein said first range of proportions spans a range of proportions of at least 35% in said first crystallographic form.

* * * * *